US009331999B2

(12) United States Patent
Fukuda

(10) Patent No.: US 9,331,999 B2
(45) Date of Patent: May 3, 2016

(54) INFORMATION PROCESSING SYSTEM AND AUTHENTICATION METHOD

(71) Applicant: Yasuharu Fukuda, Tokyo (JP)

(72) Inventor: Yasuharu Fukuda, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/591,233

(22) Filed: Jan. 7, 2015

(65) Prior Publication Data

US 2015/0200926 A1 Jul. 16, 2015

(30) Foreign Application Priority Data

Jan. 15, 2014 (JP) ................... 2014-004888

(51) Int. Cl.
*H04L 29/06* (2006.01)
*G06F 21/33* (2013.01)
*G06F 21/41* (2013.01)

(52) U.S. Cl.
CPC ........ *H04L 63/0807* (2013.01); *H04L 63/0815* (2013.01); *G06F 21/335* (2013.01); *G06F 21/41* (2013.01)

(58) Field of Classification Search
CPC ... G06F 21/335; G06F 21/41; H04L 63/0807; H04L 63/0815
USPC ....................................................... 726/5, 10
See application file for complete search history.

(56) References Cited

U.S. PATENT DOCUMENTS

| 7,644,275 | B2 * | 1/2010 | Mowers | .............. | H04L 63/0807 |
| | | | | | 380/279 |
| 7,657,657 | B2 | 2/2010 | Rao et al. | | |
| 8,271,797 | B2 * | 9/2012 | Araki | ................... | G06Q 10/107 |
| | | | | | 705/51 |
| 8,533,792 | B2 * | 9/2013 | Chua | ................... | H04L 63/0807 |
| | | | | | 713/160 |
| 8,549,298 | B2 * | 10/2013 | Rouskov | ............... | H04L 9/0825 |
| | | | | | 380/283 |

(Continued)

FOREIGN PATENT DOCUMENTS

| JP | 2006-031714 | 2/2006 |
| JP | 2008-510232 | 4/2008 |
| JP | 2014-153805 | 8/2014 |

OTHER PUBLICATIONS

Extended European Search Report dated Apr. 28, 2015.

(Continued)

*Primary Examiner* — Haresh N Patel
(74) *Attorney, Agent, or Firm* — Ipusa, PLLC

(57) ABSTRACT

An information processing system includes a first authentication function unit that issues first authentication information which is necessary to perform an authentication collaboration function between the information processing system and an external service and indicates that an authentication is completed by a first authentication function; an administration unit that issues second authentication information which is necessary to use an internal service and indicates that the authentication is completed by a second authentication function and performs, when a collaboration authentication request using the second authentication information is received from an external apparatus and if the received second authentication information is authorized, the collaboration authentication request for the first authentication function and sends the collaboration authentication response from the first authentication function to the external apparatus; and an authentication function using unit that acquires the first authentication information by performing the authentication using the first authentication function.

9 Claims, 10 Drawing Sheets

(56) References Cited

U.S. PATENT DOCUMENTS

| | | | | |
|---|---|---|---|---|
| 8,549,606 B2* | 10/2013 | Saito | H04N 7/1675 | 380/200 |
| 8,650,275 B2* | 2/2014 | Mori | G06F 21/33 | 709/223 |
| 8,656,462 B2* | 2/2014 | Kailash | H04L 63/08 | 709/201 |
| 8,739,260 B1* | 5/2014 | Damm-Goossens | H04W 12/06 | 726/4 |
| 8,768,838 B1* | 7/2014 | Hoffman | G06Q 40/00 | 705/44 |
| 8,806,201 B2* | 8/2014 | Kailash | H04L 63/0442 | 713/168 |
| 2002/0156965 A1* | 10/2002 | Gusler | G06F 11/1464 | 711/100 |
| 2005/0188225 A1* | 8/2005 | Ikenoya | H04L 63/0807 | 726/5 |
| 2005/0198379 A1* | 9/2005 | Panasyuk | G06F 21/31 | 709/239 |
| 2005/0216773 A1* | 9/2005 | Mitchell | H04L 9/083 | 726/5 |
| 2006/0021018 A1 | 1/2006 | Hinton et al. | | |
| 2008/0295162 A1* | 11/2008 | Wagner | H04L 63/0807 | 726/10 |
| 2009/0187978 A1* | 7/2009 | Upendran | H04L 67/104 | 726/5 |
| 2012/0072972 A1* | 3/2012 | Christiansen | H04L 63/0815 | 726/5 |
| 2012/0254935 A1 | 10/2012 | Yato et al. | | |
| 2013/0198801 A1 | 8/2013 | Nishizawa et al. | | |
| 2013/0227657 A1* | 8/2013 | D'Aurelio | G06F 17/30893 | 726/5 |
| 2013/0238808 A1 | 9/2013 | Hallem et al. | | |
| 2014/0032759 A1* | 1/2014 | Barton | H04L 67/10 | 709/225 |
| 2014/0223532 A1 | 8/2014 | Satoh et al. | | |
| 2014/0223535 A1* | 8/2014 | Fukuda | G06F 21/31 | 726/10 |
| 2015/0128231 A1* | 5/2015 | Nakajima | G06F 21/45 | 726/5 |
| 2015/0200926 A1* | 7/2015 | Fukuda | H04L 63/0807 | 726/5 |

OTHER PUBLICATIONS

"OpenAM 10.1.0 Installation Guide", Publication date: Aug. 26, 2013.

* cited by examiner

FIG.6

| ORGANIZATION ID | ORGANIZATION NAME |
|---|---|
| 1000000 | ○○○ |
| 1000001 | ××× |
| 1000002 | △△△ |

FIG.7

| USER ID | ORGANIZATION ID | password |
|---|---|---|
| user1 | 1000000 | Password01 |
| user2 | 1000001 | Password02 |
| user3 | 1000002 | Password03 |

FIG.8

| AUTHENTICATION TICKET IDENTIFIER | ORGANIZATION ID | USER ID | CREATED DATE | REFERRED DATE |
|---|---|---|---|---|
| abc123abc123 | 1000000 | user1 | 20130730 14:00:00 | 20130730 15:00:00 |
| def456def456 | 1000001 | user2 | 20130730 14:02:00 | 20130730 14:02:00 |
| ghi789ghi789 | 1000002 | user1 | 20130730 14:03:00 | 20130730 14:03:00 |

INFORMATION PROCESSING SYSTEM AND AUTHENTICATION METHOD

BACKGROUND OF THE INVENTION

1. Field of the Invention

The present invention relates to an information processing system and an authentication method.

2. Description of the Related Art

There is a case where a user is required to do multiple authentications when the user uses various services provided by cloud computing. A single sign-on (SSO) can lessen a user's burden of the authentication. After the user completes a sign-on operation of the SSO (after the authentication), it becomes unnecessary to do another authentication operation as disclosed in, for example, Patent Document 1.

Patent Document 1: Japanese Laid-Open Patent Publication No. 2006-31714

SUMMARY OF THE INVENTION

It is an object of at least one embodiment of the present invention to provide an information processing system and an authentication method that substantially obviate one or more problems caused by the limitations and disadvantages of the related art.

More specifically, the embodiments of the present invention may provide an information processing system and an authentication method that can lessen an influence on another authentication function for substantializing an authentication collaboration function.

One aspect of the embodiments of the present invention may be to provide an information processing system including at least one information processing apparatus including a first authentication function unit that issues first authentication information which is necessary to perform an authentication collaboration function between the information processing system and an external service provided outside the information processing system and indicates that an authentication is completed by a first authentication function; an administration unit that issues second authentication information which is necessary to use an internal service provided inside the information processing system and indicates that the authentication is completed by a second authentication function and performs, when a collaboration authentication request using the second authentication information is received from an external apparatus and if the received second authentication information is authorized, the collaboration authentication request for the first authentication function and sends the collaboration authentication response from the first authentication function to the external apparatus; and an authentication function using unit that acquires the first authentication information by performing the authentication using the first authentication function based on the collaboration authentication request for first authentication function requested from the administration unit and sends the collaboration authentication response received from the first authentication function by requesting the collaboration authentication request to the first authentication function unit using the first authentication information.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 6 illustrates a data structure of the exemplary organization information.

FIG. 7 illustrates a structure of exemplary user information.

FIG. 8 illustrates a structure of exemplary ticket information.

DETAILED DESCRIPTION OF THE PREFERRED EMBODIMENTS

Figure 1:
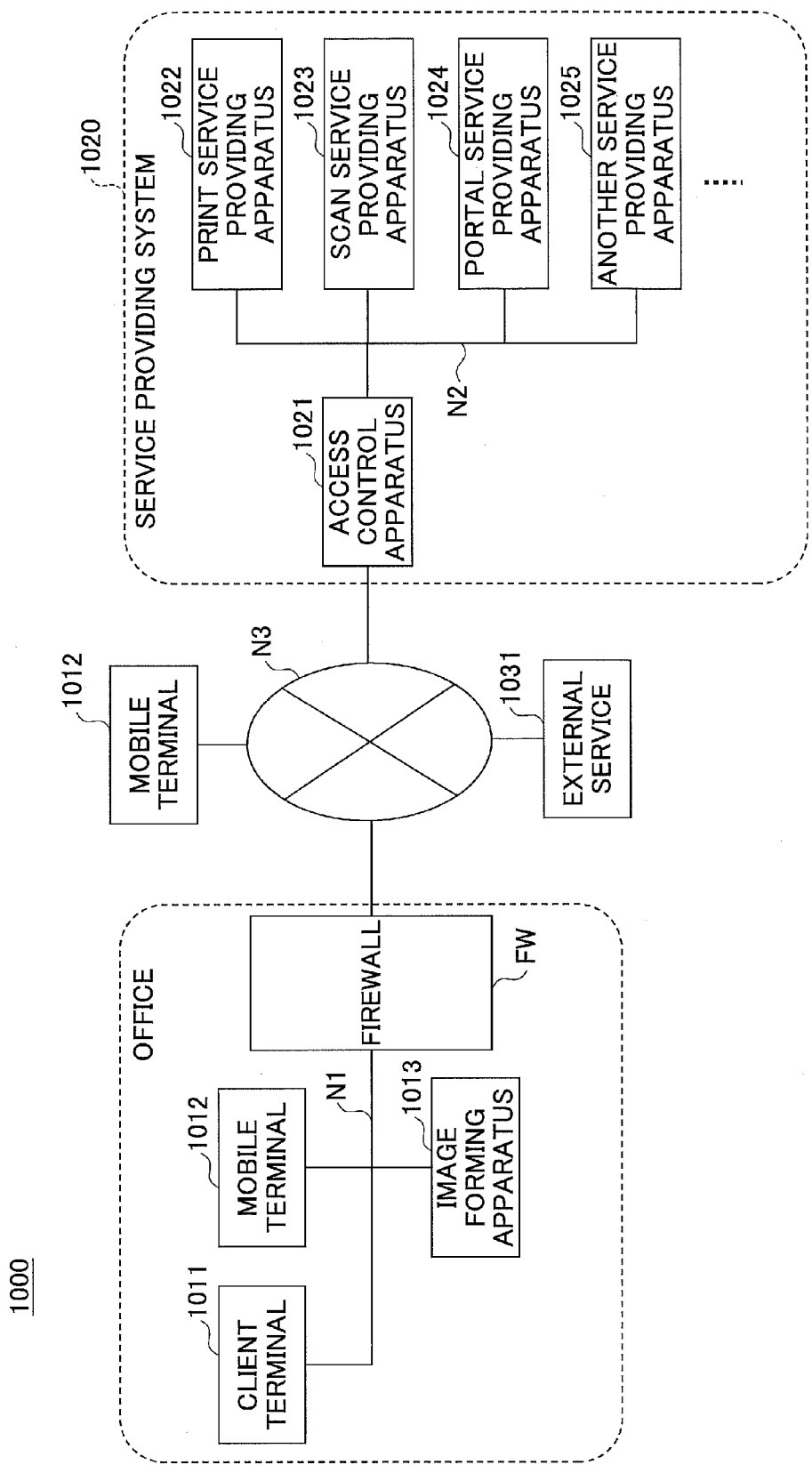
FIG. 1 illustrates a structure of an exemplary information processing system of a first embodiment.

In an information processing system providing a service using an existing authentication function, an external service may be provided using a single sign-on. In order to provide the external service using the single sign-on, an authentication collaboration function using, for example, Secure Assertion Markup Language (SAML) is required.

For example, the authentication collaboration function may be performed using, for example, OpenAM that is an open source authentication system. OpenAM is software which can be a platform for the single sign-on. OpenAM has the authentication function and the authentication collaboration function using SAML.

However, if an authentication ticket issued by OpenAM or the like can be used in the information processing system providing the service using the existing authentication function, the authentication ticket is inactivated by a restart of OpenAM or the like. When the authentication ticket is inactivated by the restart of OpenAM or the like, there is a problem that a user who is not using the external service is also subjected to a forced logout.

A description is given below, with reference to the FIG. 1 through FIG. 12 of embodiments of the present invention. Where the same reference symbols are attached to the same parts, repeated description of the parts is omitted.

Reference symbols typically designate as follows:
100: computer;
101: input device;
102: display device;
103: external I/F;
103*a*: recording medium;
104: RAM;

105: ROM;
106: CPU;
107: communication I/F;
108: HDD;
1000: information processing system;
1011: client terminal;
1012: mobile terminal;
1013: image forming apparatus;
1021: access control apparatus;
1022: print service providing apparatus;
1023: scan service providing apparatus;
1024: portal service providing apparatus;
1025: other service providing apparatus;
1031: external service;
1051: portal service providing apparatus;
1052: print service providing apparatus;
1053: scan service providing apparatus;
1061: authentication service providing apparatus;
1062: data process service providing apparatus;
1063: temporary data storage service providing apparatus;
1071: authentication information memory apparatus;
1072: job information memory apparatus;
1073: temporary data memory apparatus;
1020: service providing system;
1101: application;
1102: common service;
1103: database;
1104: application API;
1105: platform API;
1111: portal service application;
1112: scan service application;
1113: print service application;
1114, 1115: authentication agent;
1121: authentication and permission unit;
1122: organization administration unit;
1123: user administration unit;
1124: license administration unit;
1125: apparatus administration unit;
1126: temporary image storing unit;
1127: image processing workflow controlling unit;
1128: log collection unit;
1129: ticket administration unit;
1131: message queue;
1132: worker;
1141: log information memory unit;
1142: organization information memory unit;
1143: user information memory unit;
1144: license information memory unit;
1145: apparatus information memory unit;
1146: temporary image memory unit;
1147: job information memory apparatus;
1148: setup information memory unit inherent in application;
1149: ticket information memory unit;
1201: multivendor determination unit;
1202: OAuth unit;
1203: proxy authentication unit;
1204: directory service;
1205, 1206: authentication service providing unit;
1210: application delivery controller (ADC);
B: bus;
FW: firewall; and
N1-N3: network.

First Embodiment

System Structure

FIG. 1 illustrates a structure of an exemplary information processing system of a first embodiment. An information processing system 1000 illustrated in FIG. 1 includes, for example, a network N1 such as a network in an office, a network N2 of a service providing system represented by a cloud computing service, and a network N3 such as the Internet.

The network N1 is a private network located inside a firewall FW. The firewall FW is installed at a node between the network N1 and the network N3. The firewall FW detects and blocks an unauthorized access. A client terminal 1011, a mobile terminal 1012, and an image forming apparatus 1013 such as a multifunction peripheral are connected to the network N1.

The client terminal 1011 is an example of a terminal apparatus. The client terminal 1011 can be substantialized by an information processing apparatus, in which an ordinary OS or the like is installed. The client terminal 1011 includes a wired or wireless communication means. The client terminal 1011 is a terminal, which can be operated by a user, such as a tablet PC or a notebook PC.

The mobile terminal 1012 is an example of the terminal apparatus. The mobile terminal 1012 includes a wired or wireless communication means. The mobile terminal 1012 such as a smartphone, a mobile phone, a tablet PC, a notebook PC, or the like, can be carried by the user.

The image forming apparatus 1013 is an apparatus having an image forming function such as a multifunction peripheral. The image forming apparatus 1013 includes a wireless or wired communication means. The image forming apparatus 1013 is an apparatus of performing processes related to image formation such as a multifunction peripheral, a copier, a scanner, a printer, a laser printer, a projector, and an electronic blackboard.

Referring to FIG. 1, the number of the client terminal 1011, the number of the mobile terminal 1012, and the number of the image forming apparatus 1013 are one, for example. However, the numbers of the client terminal 1011, the mobile terminal 1012, and the image forming apparatus 1013 may be plural.

The network N2 is connected to the network N3 by an access control apparatus 1021. Security of the network N2 is protected by the access control apparatus 1021. A print service providing apparatus 1022, a scan service providing apparatus 1023, a portal service providing apparatus 1024, and another service providing apparatus 1025 are connected with the network N2.

In the information processing system 1000 illustrated in FIG. 1, the access controlling apparatus 1021, the print service providing apparatus 1022, the scan service providing apparatus 1023, the portal service providing apparatus 1024, and the another service providing apparatus 1025 substantialize the service providing system.

The access control apparatus 1021 controls an access to the print service providing apparatus 1022, the scan service providing apparatus 1023, the portal service providing apparatus 1024, the another service providing apparatus 1025, or the like.

The access control apparatus 1021, the print service providing apparatus 1022, the scan service providing apparatus 1023, the portal service providing apparatus 1024, and the other service providing apparatus 1025 are substantialized by at least one information processing apparatus.

The access control apparatus 1021, the print service providing apparatus 1022, the scan service providing apparatus 1023, the portal service providing apparatus 1024, and the other service providing apparatus 1025 may be substantialized by incorporating into one information processing apparatus or by distributing to multiple information processing apparatuses.

A part of the service on the side of the network N2 may exist outside the network N2. The mobile terminal 1012 may exist outside the network N1 such as an inter-office network. In the information processing system 1000 illustrated in FIG. 1, the mobile terminal 1012 exists in the network N1 and the network N3. An external service 1031 connected to the network N3 is an apparatus providing a service such as an online storage.

The external service is an example of a service provider (SP) providing a service to a client in response to information of an authentication and permission issued by identity provider (IdP). The service providing system 1020 is an example of the IdP.

Figure 2:
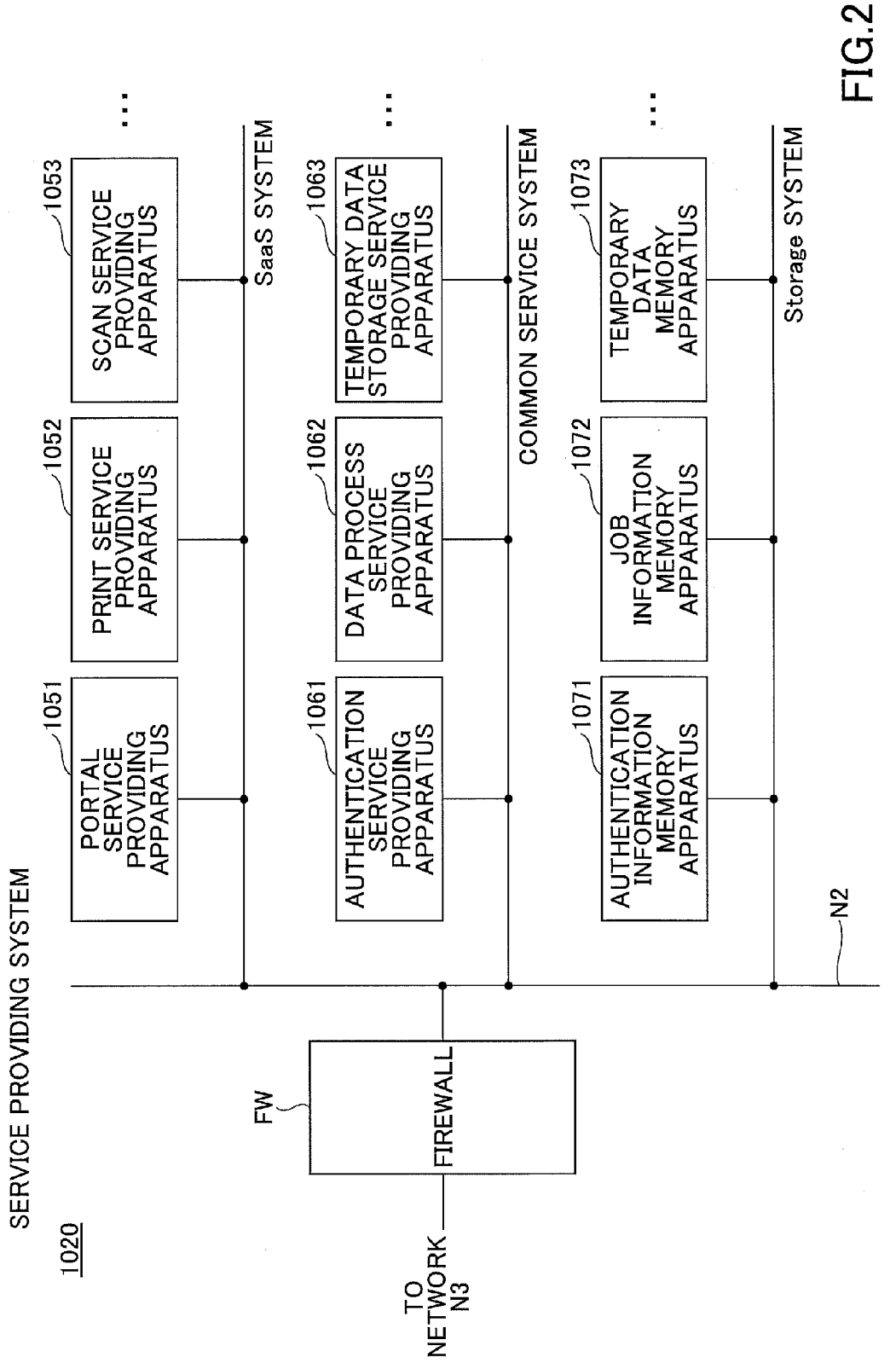
FIG. 2 illustrates a structure on another exemplary service providing system.

The structure of the service providing system 1020 illustrated in FIG. 1 is an example. The service providing system may be substantialized by a structure illustrated in FIG. 2. FIG. 2 illustrates a structure on another exemplary service providing system. In the service providing system 1020 illustrated in FIG. 2, the network N2 is connected to the network N3 by the firewall FW.

A service providing apparatus of a Software as a Service (SaaS) system, a service providing apparatus of a common service (Network Service Platform) system, and a memory apparatus of a storage (Storage) system are connected to the network N2. Here, the service providing apparatus of the common service system provides a service used by the service providing apparatus of the SaaS system in common.

The service providing apparatus of the SaaS system includes a service providing apparatus corresponding to provided services, such as a portal service providing apparatus 1051, a print service providing apparatus 1052, a scan service providing apparatus 1053, or the like. The service providing apparatus of the common service system includes a service providing apparatus corresponding to provided common services, such as an authentication service providing apparatus 1061, a data process service providing apparatus 1062, or a temporary data storage service providing apparatus 1063. The memory apparatus of the storage system includes a memory apparatus corresponding to stored information (data), such as an authentication information memory apparatus 1071, a job information memory apparatus 1072, or a temporary data memory apparatus 1073.

In the service providing system 1020 illustrated in FIG. 2, security is protected by an authentication service provided by, for example, the firewall FW or the authentication service providing apparatus 1061. The structure of the service providing system 1020 illustrated in FIG. 2 is an example. The service providing system 1020 may have another structure.

<Hardware Structure>

Figure 3:
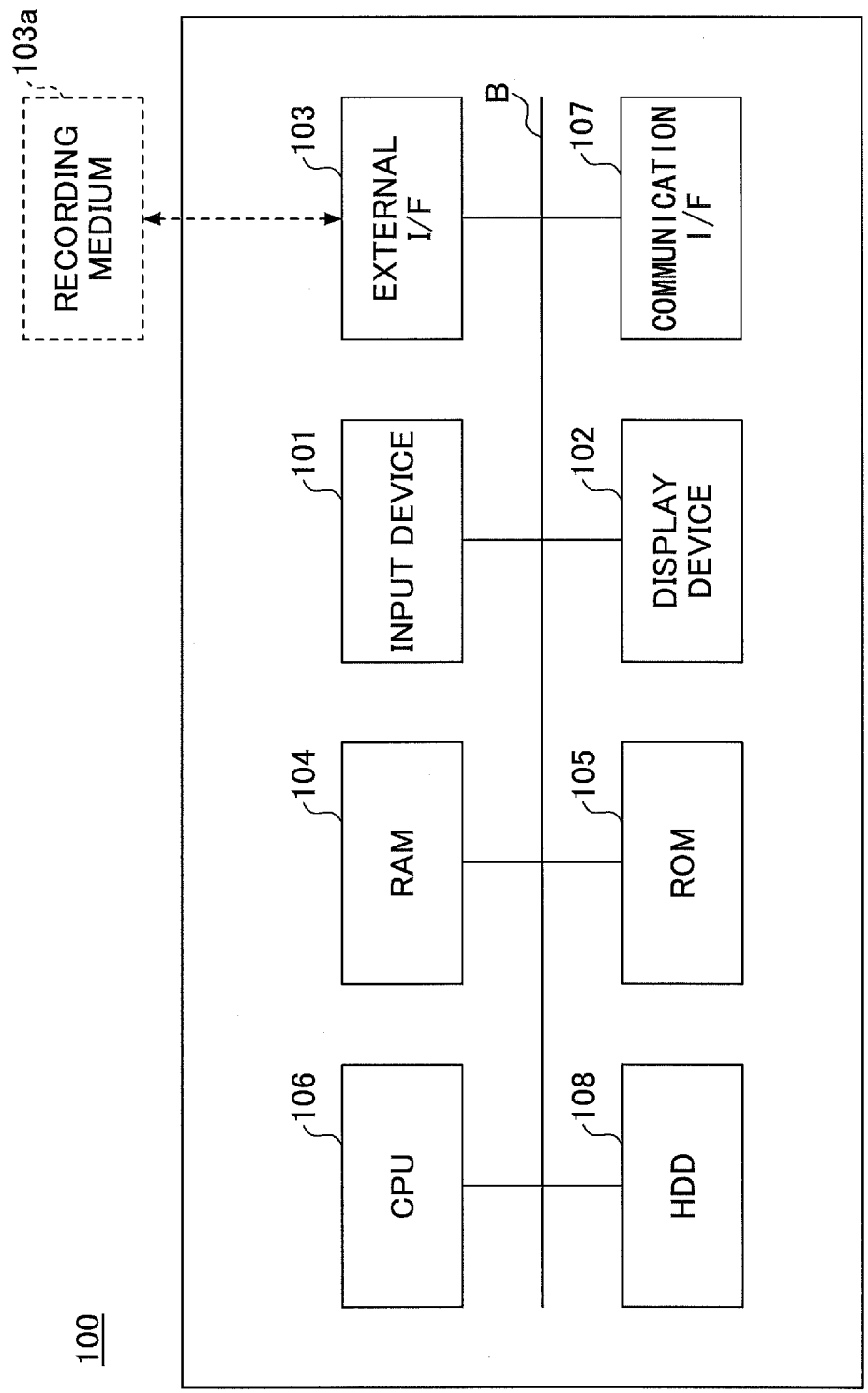
FIG. 3 illustrates an exemplary hardware structure of a computer.

The client terminal 1011 and the mobile terminal 1012 are substantialized by a computer 100 having, for example, a hardware structure illustrated in FIG. 3. The access control apparatus 1021, the print service providing apparatus 1022, the scan service providing apparatus 1023, the portal service providing apparatus 1024, and the other service providing apparatus 1025 are substantialized by a computer having a hardware structure as illustrated in, for example, FIG. 3.

Further, the service providing apparatus of the SaaS system, the service providing apparatus of the common service system, and the memory apparatus of the storage system are substantialized by the computer having the hardware structure as illustrated in, for example, FIG. 3.

FIG. 3 illustrates an exemplary hardware structure of the computer. Referring to FIG. 3, the computer 100 includes an input device 101, a display device 102, an external I/F 103, a RAM 104, a ROM 105, a CPU 106, a communication I/F 107, a HDD 108, and so on, mutually connected by a bus B.

The input device 101 includes a keyboard, a mouse, a touch panel, and the like, by which the user can input various operation signals. The display device 102 includes a display or the like to display a processing result obtained by the computer 100. It is acceptable to structure such that the input device 101 and the display device 102 may be connected to the bus B when necessary.

The communication I/F 107 is an interface provided to connect the computer 100 with the networks N1 to N3. Thus, the computer 100 can perform data communications through the communication I/F 107.

The HDD 108 is a non-volatile memory device storing programs and/or data. The program and/or data to be stored are an OS being basic software controlling the entire computer 100, application software providing various functions in the OS, and so on.

Further, the HDD 108 administrates the stored program and the stored data using a predetermined file system and/or a predetermined data base (DB). The external I/F 103 is an interface with an external apparatus. The external device is a recording medium 103a or the like.

With this, the computer 100 can read information from the recording medium 103a and/or write information to the recording medium 103a through the external I/F 103. The recording medium 103a is a flexible disk, a CD, a DVD, an SD memory card, a USB memory, or the like.

The ROM 105 is a non-volatile semiconductor memory (a memory device), which can hold a program and/or data even when a power source is powered off. The ROM 105 stores programs and data such as a basic input/output system (BIOS), an OS setup, a network setup, or the like, which are executed at a time of booting up the computer 100. The RAM 104 is a volatile semiconductor memory (a memory device) temporarily storing a program and/or data.

The CPU 106 reads the program and/or the data from the memory device such as the ROM 105, the HDD 108, or the like. The read program or the read data undergo the process to thereby substantialize controls or functions of the entire computer 100.

The hardware structures of the computers 100 (FIG. 3) of the client terminal 1011 and the mobile terminal 1012 can perform various processes described below. The hardware structures of the computers 100 (FIG. 3) of the access control apparatus 1021, the print service providing apparatus 1022, the scan service providing apparatus 1023, the portal service providing apparatus 1024, and the other service providing apparatus 1025 can perform various processes described below.

Further, the hardware structures of the computers 100 (FIG. 3) of the service providing apparatus of the SaaS system, the service providing apparatus of the common service system, and the memory apparatus of the storage system can perform various processes described below. Further, the hardware structure of the computer 100 (FIG. 3) of the external service 1031 can perform various processes described below. A description of the hardware structures of the image forming apparatus 1013 and the firewall FW, which are illustrated in FIG. 1, is omitted.

<Software Structure>
<<Service Providing System>>

Figure 4:
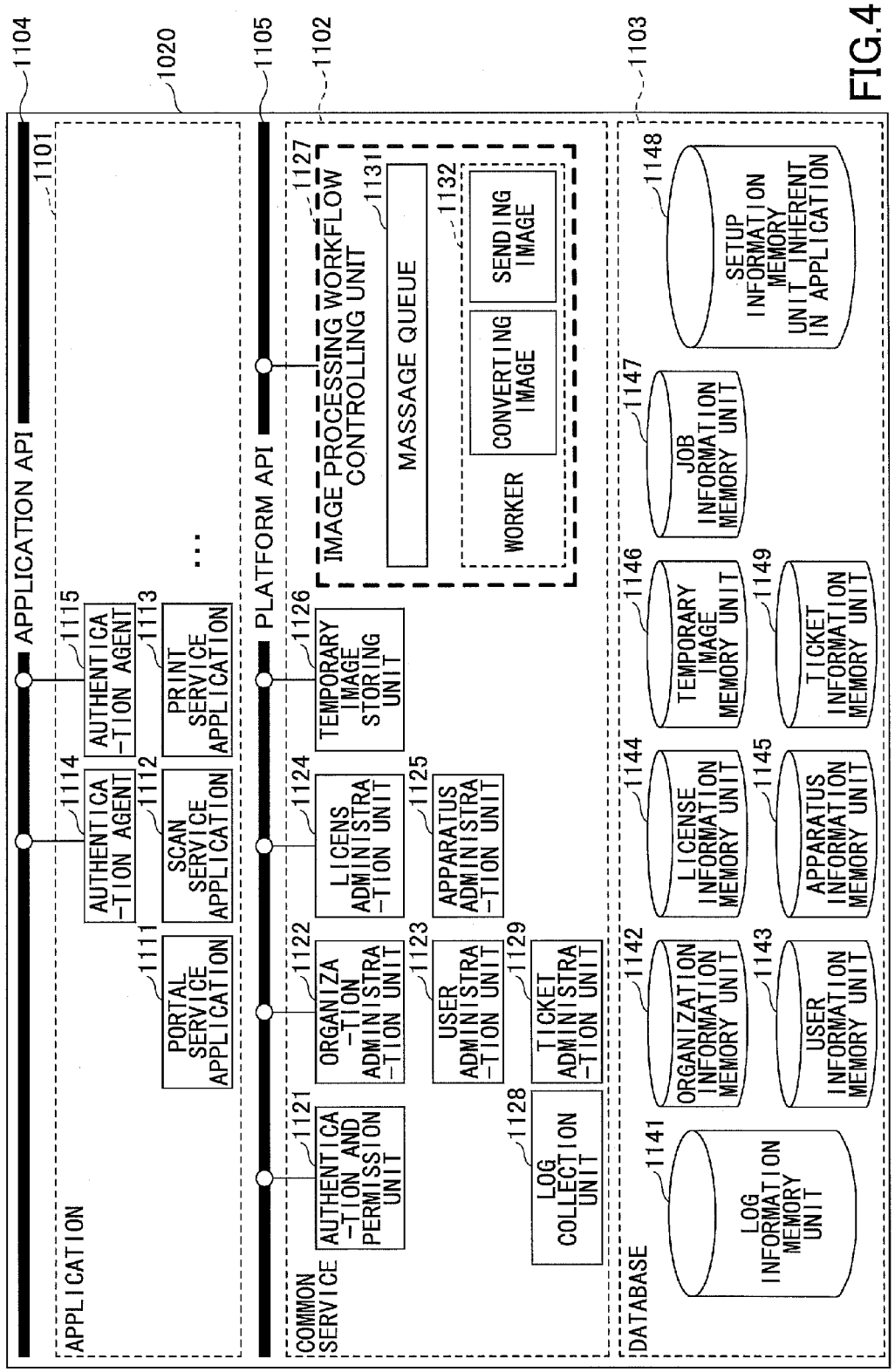
FIG. 4 is a processing block chart of an exemplary service providing system of the first embodiment.

The service providing system 1020 of the first embodiment is substantialized by, for example, a processing block illustrated in FIG. 4. FIG. 4 is a processing block chart of an exemplary service providing system of the first embodiment.

The service providing system 1020 executes the program so as to substantialize the application 1101, the common service 1102, the database (DB) 1103, the application API 1104, and the platform API 1105.

The application API 1104 is an interface for using the application 1101 by the terminal apparatus such as the client terminal 1011. The application API 1104 is the interface previously defined so that the application 1101 receives a request from the terminal apparatus. The application 1101 is structured by, for example, a function, a class, or the like.

The application API 1104 can be substantialized by, for example, Web API which can be used through the network when the service providing system 1020 is structured by multiple information processing apparatuses.

The application 1101 includes, for example, the portal service application 1111, the scan service application 1112, the print service application 1113, and the authentication agents 1114 and 1115.

The portal service application 1111 is an application providing a portal service. The portal service provides a service as an entrance for using the service providing system 1020. The scan service apparatus 1112 is an application for providing a scan service. The print service application 1113 is an application providing a print service. The application 1101 may include another service application.

The authentication agents 1114 and 1115 protect the scan service application 1112 and the print service application 1113 from an unauthorized request. The scan service application 1112 and the print service application 1113 are protected from the unauthorized request by the authentication agents 1114 and 1115, and receives a request from a terminal apparatus or the like having an authorized authentication ticket.

The platform API 1105 is an interface used when the application such as the portal service application 1111, the scan service application 1112, and the print service application 1101 accesses the common service 1102. The platform API 1105 is an interface previously defined so that the common service 1102 receives a request from the application 1101. The platform API 1104 is structured by, for example, a function, a class, or the like.

The platform API 1105 can be substantialized by, for example, Web API which can be used through the network N2 when the service providing system 1020 is structured by multiple information processing apparatuses.

The common service 1102 includes an authentication and permission unit 1121, an organization administration unit 1122, a user administration unit 1123, a license administration unit 1124, an apparatus administration unit 1125, a temporary image storing unit 1126, an image processing workflow controlling unit 1127, a log collection unit 1128, and a ticket administration unit 1129.

The image processing workflow controlling unit 1127 includes a message queue 1131 and at least one worker (Worker) 1132. The worker 1132 substantializes a function such as an image conversion or an image transmission.

The authentication and permission unit 1121 performs the authentication and/or the permission based on a login request received from an office equipment such as the client terminal 1011, the image forming apparatus 1013, or the like. The office equipment is a general term of the client terminal 1011, the mobile terminal 1012, the image forming apparatus 1013, and so on.

The authentication and permission unit 1121 accesses, for example, a user information memory unit 1143, a license information memory unit 1144, or the like, which are described below, and authenticates and/or permits the user.

Further, the authentication and permission unit 1121 accesses, for example, an organization information memory unit 1142, the license information memory unit 1144, the apparatus information memory unit 1145, or the like to authenticate the image forming apparatus 1013 or the like.

The organization administration unit 1122 administrates organization information stored in the organization information memory unit 1142. The user administration unit 1123 administers the user information stored in the user information memory unit 1143 described below.

The license administration unit 1124 administers the license information stored in the license information memory unit 1144 described below. The apparatus administration unit 1125 administers apparatus information stored in the apparatus information memory unit 1145 described later. The temporary image storing unit 1126 stores a temporary image in a temporary image memory unit 1146 described later and acquires the temporary image from the temporary image memory unit 1146.

The image processing workflow controlling unit 1127 controls a workflow related to image processing based on a request from the application 1101. The message queue 1131 includes queues corresponding to types of the processes. The image processing workflow controlling unit 1127 inputs a message of a request related to a process (a job) into the queue corresponding to the type of the job.

The worker 1132 monitors the corresponding queue. When the message is input to the queue, the worker 1132 performs a process such as an image conversion or an image transmission corresponding to the type of the job. The message input to the queue may be mainly read out (Pull) by the worker 1132, or may be provided (Push) from the queue to the worker 1132.

The log collection unit 1128 administers the log information stored in the log information memory unit 1141 described below. The ticket administration unit 1129 has functions of an issuance of the authentication ticket associated with the user, a check of authenticity of the authentication ticket, an administration of an expiry date, an administration of an upper limit, or the like.

The database 1103 includes a log information memory unit 1141, an organization information memory unit 1142, a user information memory unit 1143, a license information memory unit 1144, an apparatus information memory unit 1145, a temporary image memory unit 1146, a job information memory unit 1147, a setup information memory unit inherent in application 1148, and a ticket information memory unit 1149.

The log information memory unit 1141 stores log information. The organization information memory unit 1142 stores organization information described below. The user information memory unit 1143 stores user information described below. The license information memory unit 1144 stores license information described below. The apparatus information memory unit 1145 stores apparatus information described below.

The temporary image memory unit 1146 stores a temporary image. The temporary image is a file or data such as a scanned image processed by, for example, the worker 1132. The job information memory unit 1147 stores information (job information) of the request related to the process (the job). The setup information memory unit 1148 inherent in application stores setup information inherent in the application 1101. The ticket information memory unit 1149 stores license information described below.

The service providing system 1020 functions as an integrated platform for providing a common service such as the authentication and permission or a workflow related to image processing and a service group for providing an application service such as a scan service, a portal service, or the like. The integrated platform is structured by, for example, the common service 1102, the DB 1103, and the platform API 1105. The service group is formed by, for example, the application 1101 and the application API 1104.

In the service providing system 1020, by adopting the structure where the service group and the integrated platform are separated, it is possible to easily develop the application 1105 using the platform API 1105.

A mode of classifying the processing blocks of the service providing system 1020 illustrated in FIG. 4 is an example. It is unnecessary that the application 1101, the common service 1101, and the DB 1103 are classified in a hierarchy illustrated in FIG. 4. As long as the processes of the service providing system 1020 of the first embodiment can be processed, a relationship of the hierarchy illustrated in FIG. 4 is not specifically limited.

<<Authentication and Permission Unit>>

Figure 5:
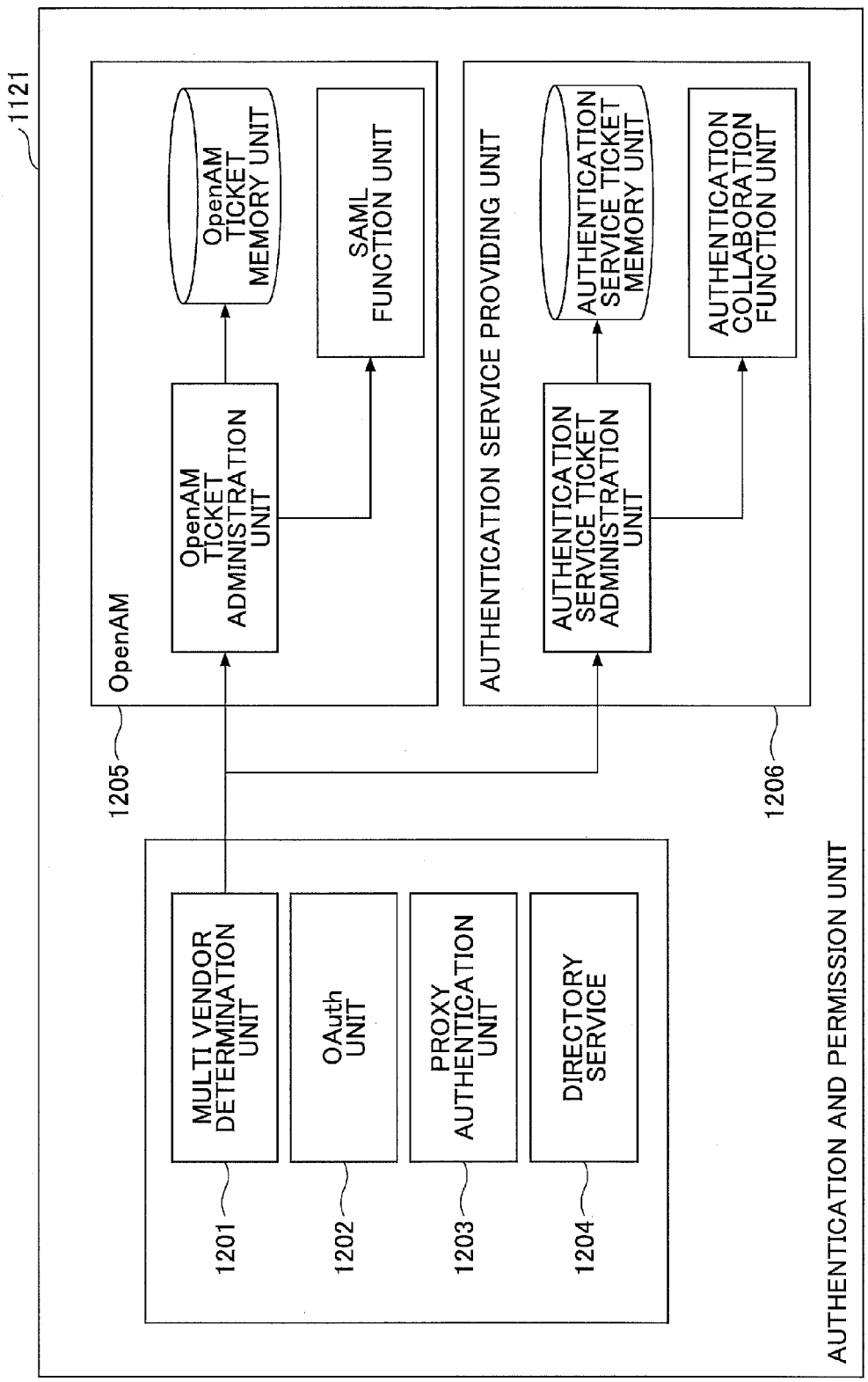
FIG. 5 is an exemplary process block chart of an authentication and permission unit.

The authentication and permission unit 1121 is substantialized by processing blocks illustrated in FIG. 5. FIG. 5 is an exemplary process block chart of the authentication and permission unit. The authentication and permission unit 1121 includes a multivendor determination unit 1201, an OAuth unit 1202, a proxy authentication unit 1203, a directory service 1204, and authentication service providing units 1205 and 1206.

The OAuth unit 1202 performs an API permission for the external service 1031 using an OAuth protocol. The proxy authentication unit 1203 performs an authentication process of authenticating the external service 1031 by proxy. The directory service 1204 performs a crud process (creation, read, update, deletion) of the organization information, the user information, or the like.

The multivendor determination unit 1201 determines whether the authentication service providing units 1205 and 1206 providing the authentication service is used. The multivendor determination unit 1201 determines the authentication service providing unit 1205 or 1206 which provides the authentication service is used in response to the request from the user, and the determined authentication service providing unit 1205 or 1206 is used. Said differently, the multivendor determination unit 1201 determines the authentication service providing units 1205 and 1206 providing the authentication service requested to be used.

Further, the authentication service providing units 1205 and 1206 are an example of a module providing the authentication service. The authentication service providing unit 1205 is an example of substantializing the module by OpenAM. The authentication service providing unit 1206 is an example of substantializing the module by a certain authentication service.

The authentication service providing unit 1205 includes, for example, an OpenAM ticket administration unit, an OpenAM ticket memory unit, and a SAML function unit. Further, the authentication service providing unit 1206 includes, for example, an authentication service ticket administration unit, an authentication service ticket memory unit, and an authentication collaboration function unit for a certain authentication service. When the authentication service providing unit 1205 or 1206 is used, an authentication ticket (a session) issued by the authentication service providing unit 1205 or 1206 is necessary.

<<Organization Information>>

FIG. 6 illustrates a data structure of the exemplary organization information. Items of the organization information illustrated in FIG. 6 include an organization ID and an organization name. The organization ID is information uniquely specifying groups such as companies, departments, or the like. The organization ID is not limited to a meaning of the organization and may be information for identifying, for example, a contract. The organization ID is uniquely determined. The organization name represents the name of the group such as the company or the department.

<<User Information>>

FIG. 7 is a structural view of exemplary user information. Items of the user information are, for example, a user ID, an organization ID, and a password. The user ID and the password are information for specifying the user. The user ID may be the user name or the like. The password is not indispensable. Although the user ID and the password administered by the same organization ID is uniquely determined, if the organization IDs are different, the user ID and the password can be the same.

Further, identification information of an electronic medium (for example, an IC card) owned by the user may be used as the user ID. The electronic medium owned by the user may be an IC card, a mobile phone, a tablet terminal, an electronic book reader, or the like. Information identifying the electronic medium is a card ID, a serial ID, a telephone number of the mobile phone, profile information of a terminal, or the like. It is possible to combine the information identifying the electronic medium in using the information identifying the electronic medium.

<<Ticket Information>>

FIG. 8 is a structural view of exemplary ticket information. Items of the ticket illustrated in FIG. 8 are an authentication ticket identifier, the organization ID, the user ID, a created date, and a referred date. The authentication ticket identifier is information uniquely identifying the authentication ticket. The authentication ticket identifier is created by a predetermined rule.

Further, the organization ID and the user ID are associated with the authentication ticket identifier in the ticket information to specify the user from the authentication ticket identifier. The ticket information associates the created date and the referred date with the authentication ticket identifier in order to administer the expiry date of the authentication ticket. Validity of the authentication ticket is determined in conformity with a predetermined rule and in use of the created date and the referred date.

<Detailed Process>

<<Use of Application Provided by Service Providing System>>

Figure 9:
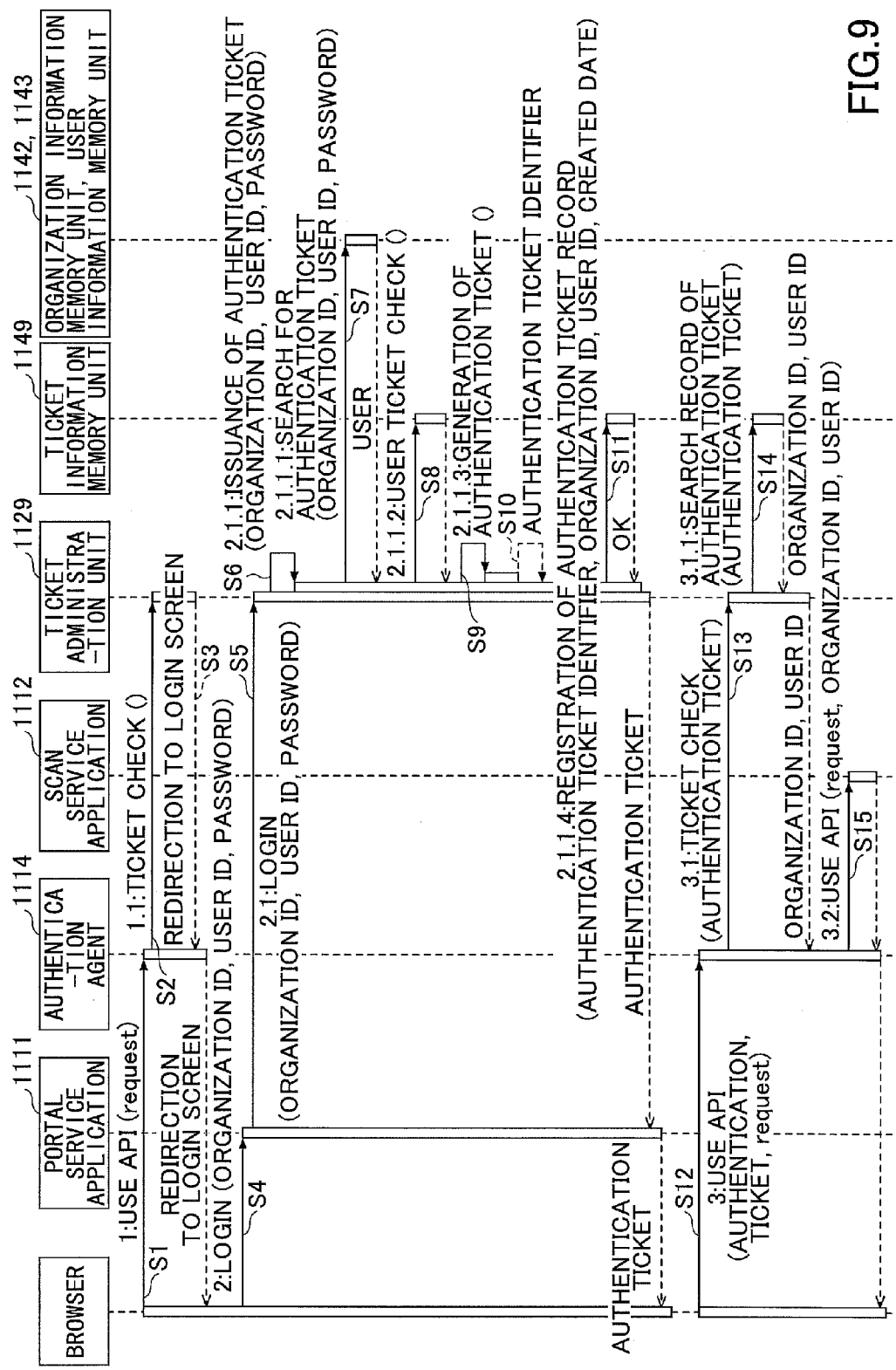
FIG. 9 is a sequence chart illustrating an exemplary process of using an application provided by the service providing system.

FIG. 9 is a sequence chart illustrating an exemplary process of using an application provided by the service providing system. The sequence chart of FIG. 9 illustrates an example where the application 1101 protected by the authentication ticket of the service providing system 1020 is used.

In step S1, a browser (Client App) installed on the office equipment illustrated in FIG. 1 requests to use the scan service application 112 from the application API 1104 without having the authentication ticket of the service providing system 1020.

In step S2, the authentication agent 1114 requests the ticket administration unit 1129 to check the authenticity of the authentication ticket for the request from the browser installed on the office equipment to the scan service application 1112. The ticket administration unit 1129 performs the authenticity check of the authentication ticket. Since the request is without having the authentication ticket, the request is determined as not having the authorized authentication ticket.

In step S3, the browser installed on the office equipment is requested by the authentication agent 1114 to redirect to the login screen for logging in the service providing system 1020. The browser is redirected to a login screen for logging in the portal service application 1111 of the service providing system 1020.

The user inputs the authentication information such as the organization ID, the user ID, the password, or the like to the login screen and requests the login. In step S4, the browser requests the login to the portal service application 1111. The request to log in the service application includes the organization ID, the user ID, and the password.

In step S5, the portal service application 1111 requests a login using the organization ID, the user ID, and the password, which are included in the request to log in from the browser, to the ticket administration unit 1129. In step S6, the ticket administration unit 1129 starts an issuance process of issuing the authentication ticket using the organization ID, the user ID, and the password, which are included in the request to log in from the browser.

In step S7, the ticket administration unit 1129 request an authentication of the organization ID, the user ID, and the password, which are included in the request to log in from the browser, to the authentication and permission unit 1121 and the authentication is performed. The authentication and permission unit checks whether a set of the organization ID, the user ID, and the password, which are included in the request to log in from the browser is stored in the user information memory unit 1143 as the user information illustrated in FIG. 7.

If the set of the organization ID, the user ID, and the password, which are included in the request to log in from the browser is stored in the user information memory unit 1143, the authentication and permission unit 1121 reports a success of the authentication to the ticket administration unit 1129. Here, the explanation is given on the premise that the success of the authentication is reported to the ticket administration unit 1129.

In step S8, the ticket administration unit 1129 refers to ticket information stored in the ticket information memory unit 1149 as illustrated in FIG. 8 and checks an issued authentication ticket of the user whose authentication was successful. For example, the ticket administration unit 1129 performs an administration of an upper limit of the issued authentication ticket or the like.

In step S9, the ticket administration unit 1129 creates the authentication ticket. In step S10, the ticket administration unit 1129 creates the authentication ticket identifier. In step S11, the ticket administration unit 1129 registers ticket information for associating the organization ID and the user ID of, the user whose authentication was successful and the created authentication ticket identifier with the created date in the ticket information memory unit 1149. Further, the ticket administration unit 1129 returns the authentication ticket to the browser as a response to the request to log in.

Figure 12:
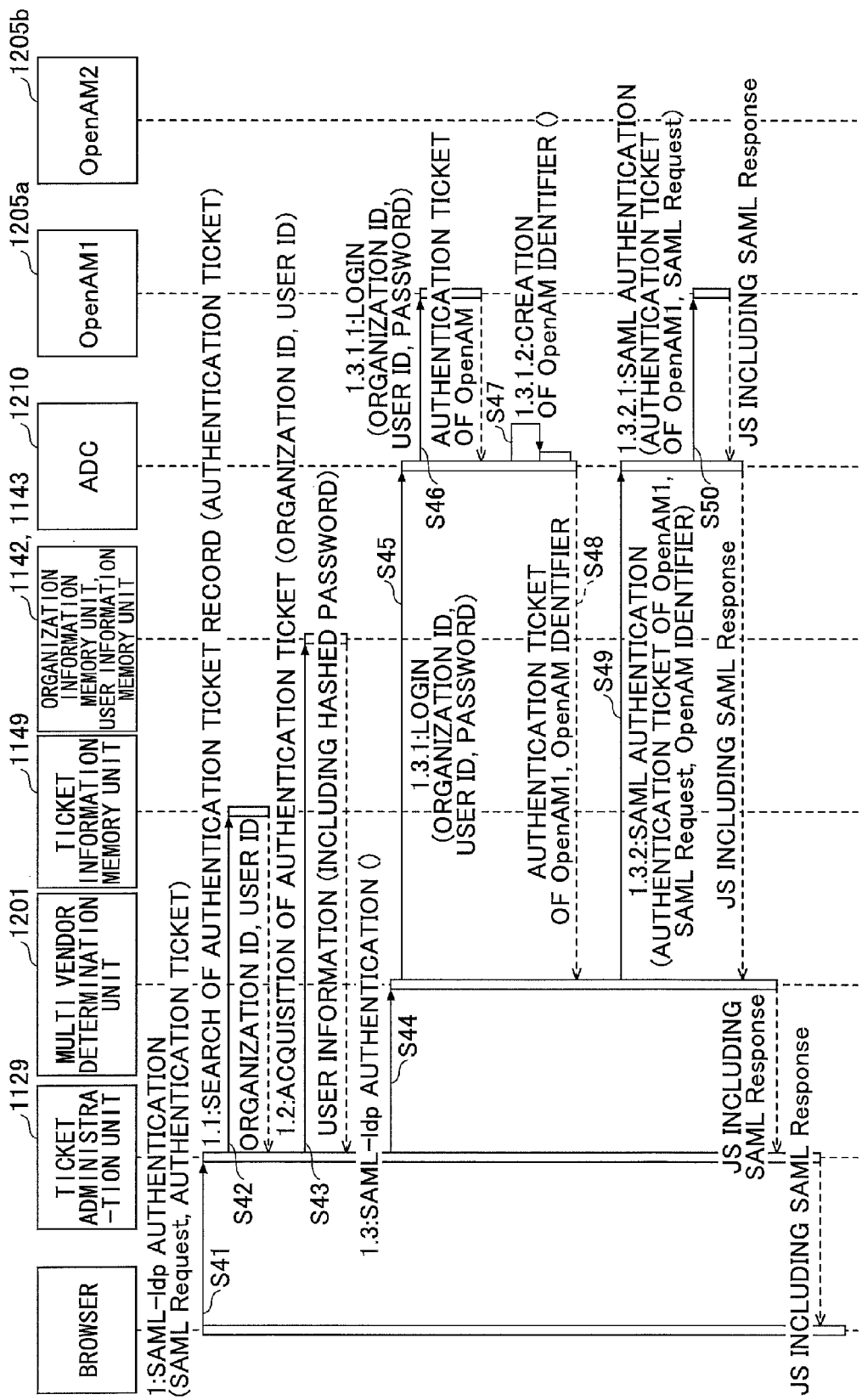
FIG. 12 is a sequence chart illustrating another exemplary process of performing the authentication collaboration with the external service.

In step S12, a browser installed on the office equipment illustrated in FIG. 12 requests to use the scan service application 112 from the application API 1104 in a state where the browser has the authentication ticket of the service providing system 1020.

In step S13, the authentication agent 1114 arranged at a former stage of the scan service application 1112 requests the ticket administration unit 1129 to check the authenticity of an authentication ticket of the request from the browser to the scan service application 1112. In step S14, the ticket administration unit 1129 refers to the ticket information (see FIG. 8) stored in the ticket information memory unit 1149 and performs the authenticity check of the authentication ticket.

The ticket administration unit 1129 determines that the authentication ticket passes the authenticity check as being authorized because the authentication ticket from the browser to the scan service application 1112 is stored in the ticket information memory unit 1149. The ticket administration unit 1129 acquires the organization ID and the user ID, which are associated with the authentication ticket of the request from the browser to the scan service application 1112, from the ticket information memory unit 1149. A referred date of the ticket information as illustrated in FIG. 8 stored in the ticket information memory unit 1149 is updated by a process of step S14.

The ticket administration unit 1129 returns the organization ID and the user ID, which are associated with the authentication ticket of the request from the browser to the scan service application 1112 as a response to the request in step S13.

The authentication agent 1114 adds the organization ID the user ID, which are associated with the authentication ticket, in step S15, and requests the scan service application 1112 for a use of the scan service application 1112.

As described, the service providing system 1020 uses the authentication ticket of the service providing system 1020 to protect the application 1101 from an unauthorized request.

<<Authentication Collaboration with External Service>>

Figure 10:
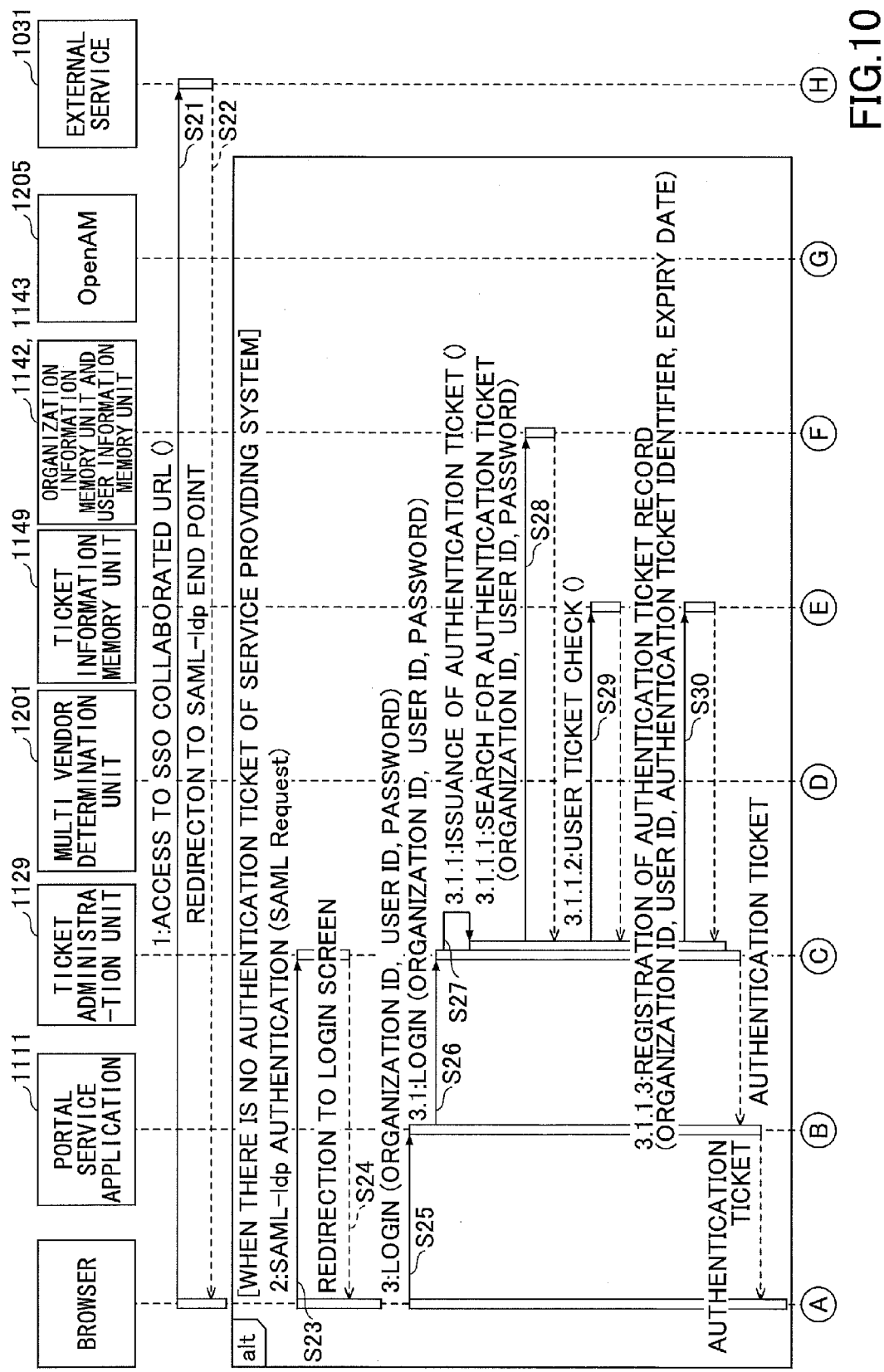
FIG. 10 is a sequence chart illustrating an exemplary process of performing authentication collaboration with an external service.
Figure 11:
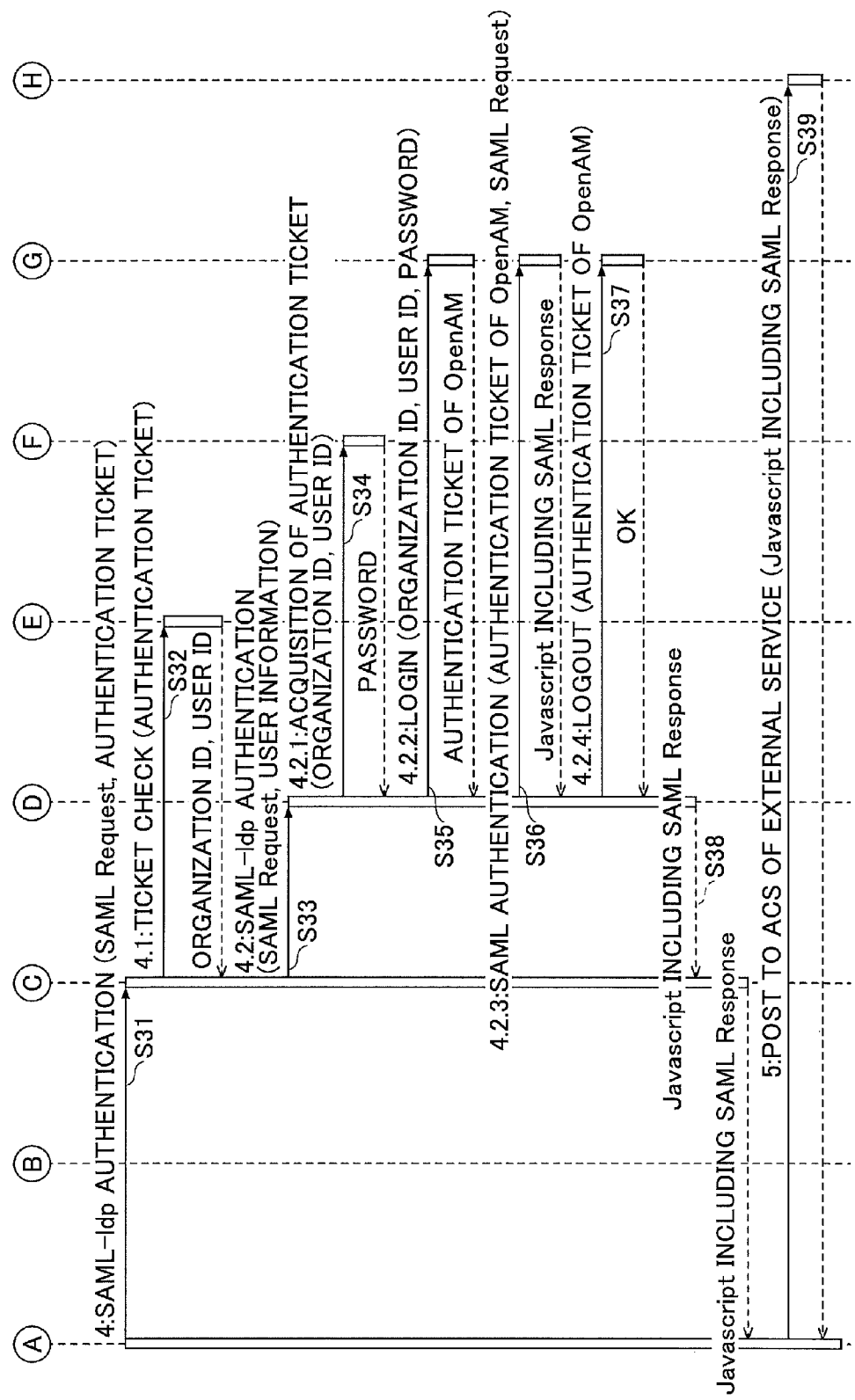
FIG. 11 is the sequence chart illustrating the exemplary process of performing authentication collaboration with the external service.

FIGS. 10-11 are sequence charts illustrating an exemplary process of performing authentication collaboration with an external service. The sequence charts illustrated in FIGS. 10-11 are exemplary sequence charts in which the service providing system 1020 performs the authentication collaboration (SAML collaboration) between the external service 1031 and SAML.

In step S21, the browser installed on the office equipment of FIG. 1 accesses the external service 1031 when the URL of the external service 1031 is input or selected from bookmarks as an access destination, for example.

In steps S22 and S23, the browser is redirected to an end point of the service providing system 1020, which is set to enable a single sign-on. The browser requests the ticket administration unit 1129 for the SAML collaboration.

Because the request is without the authentication ticket of the service providing system 1020, the ticket administration unit 1129 requests the browser to redirect to the login screen is step S24. The browser installed on the office equipment is requested by the ticket administration unit 1129 to redirect to the login screen for logging in the service providing system 1020. The browser is redirected to the login screen for logging in the portal service application 1111 of the service providing system 1020.

The user inputs the authentication information such as the organization ID, the user ID, the password, or the like to the login screen and requests the login. In step S25, the browser requests the login to the portal service application 1111. The request to log in the portal service application 1111 includes the organization ID, the user ID, and the password.

In step S26, the portal service application 1111 requests a login using the organization ID, the user ID, and the password, which are included in the request to log in from the browser, to the ticket administration unit 1129. Because the processes of steps S27 to S30 are similar to the processes of steps S6 to S11 of FIG. 9, explanation is omitted.

In step S31, the browser installed on the office equipment of FIG. 1 requests the ticket administration unit 1129 to perform SAML-Idp authentication in a state where the browser has the authentication ticket of the service providing system 1020. In step S32, the ticket administration unit 1129 refers to the ticket information (see FIG. 8) stored in the ticket information memory unit 1149 and performs the authenticity check of the authentication ticket.

The ticket administration unit 1129 determines that the authentication ticket is authorized as having the authenticity if the authentication ticket included in the request for the SAML-Idp authentication in step S31 is stored in the ticket information memory unit 1149. When the authentication ticket included in the request for the SAML-Idp authentication is authorized as having the authenticity, the ticket administration unit 1129 acquires the organization ID and the user ID, which are associated with the authentication ticket included in the request for the SAML-Idp authentication as the user information from the ticket information memory unit 1149.

In step S33, the ticket administration unit 1129 requests the multivendor determination unit 1201 for the SAML-Idp authentication using the acquired user information. The multivendor determination unit 1201 refers to the user information memory unit 1143 in step S34 and acquires the password associated with the organization ID and the user ID, which are included in the SAML-Idp authentication as the user information.

In step S35, the multivendor determination unit 1201 requests the OpenAM being an example of the authentication service providing unit 1205 for the login using the acquired organization ID, the acquired user ID, and the acquired password. The reason why the login is requested to the OpenAM is that the OpenAM has a function of the SAML collaboration and the authentication ticket of the OpenAM is necessary to use the API of the function of the SAML. The OpenAM creates the authentication ticket of the OpenAM when the authentication is successful, and returns the authentication ticket to the multivendor determination unit 1201 as a response to the request for the login.

In step S36, the multivendor determination unit 1201 requests the OpenAM for the SAML collaboration using the authentication ticket of the OpenAM (SAML request). When the authentication ticket is successfully authenticated, the OpenAM creates Javascript ("Javascript" is registered trademark) including the SAML response and returns the created Javascript to the multivendor determination unit 1201.

After the multivendor determination unit 1201 receives the Javascript including the SAML response, the multivendor determination unit 1201 logs out from the OpenAM and discards the authentication ticket of the OpenAM. In step S38, the multivendor determination unit 1201 returns the Javascript including the SAML response from the ticket administration unit 1129 to the browser.

In step S39, the browser performs POST for a SAML response of the service providing system 1020 to ACS of the external service 1031 so as to substantialize the SAML collaboration with the external service 1031.

Said differently, the OpenAM designates the address of the external service 1031 which performs POST for the SAML response and causes the browser to perform POST by designating the address of the external service 1031. The external service 1031 checks the SAML response and causes a service screen for a corresponding user to be displayed on the browser.

As described, in the service providing system 1020, the authentication ticket for using the service providing system 1020 and the authentication ticket for the OpenAM substantializing the authentication collaboration function are different. The service providing system 1020 issues the authentication ticket of the OpenAM at a timing of using the authentication collaboration function and deletes the authentication ticket of the OpenAM after using the authentication collaboration function so as to reduce an influence of the OpenAM substantializing the authentication collaboration function.

Therefore, in the service providing system 1020 of the embodiment, even if the authentication ticket of the OpenAM is inactivated by a restart caused by a release, a maintenance, or the like of the OpenAM, an influence caused by this inactivation.

<<Load Distribution of OpenAM>>

For example, the authentication service providing units 1205 and 1206 such as the OpenAM can have a redundant structure by controlling the request destination using an application delivery controller (ADC) or the like. In the service providing system 1020 of the embodiment 1020, requests to the OpenAM can be distributed by arranging the ADC 1210 on a former stage of multiple OpenAMs.

FIG. 12 is a sequence chart illustrating another exemplary process of performing the authentication collaboration with the external service. The sequence chart of FIG. 12 illustrates a process performed after the processes of, for example, steps S21 to S30 of FIG. 10.

In step S41, the browser installed on the office equipment of FIG. 1 requests the ticket administration unit 1129 to perform the SAML-Idp authentication in a state where the browser has the authentication ticket of the service providing system 1020. In step S42, the ticket administration unit 1129 refers to the ticket information (see FIG. 8) stored in the ticket information memory unit 1149 and performs the authenticity check of the authentication ticket.

When the authentication ticket included in the request for the SAML-Idp authentication is authorized as having the authenticity, the ticket administration unit 1129 acquires the organization ID and the user ID, which are associated with the authentication ticket included in the request for the SAML-Idp authentication as the user information from the ticket information memory unit 1149.

The ticket administration unit 1129 refers to the user information memory unit 1143 in step S43 and acquires the password (including a hashed password) associated with the organization ID and the user ID, which are included in the SAML-Idp authentication as the user information. In step S44, the ticket administration unit 1129 requests the multivendor determination unit 1201 for the SAML-Idp authentication using the acquired user information.

In step S45, the multivendor determination unit 1201 requests OpenAM 1205*a* or 1205*b* being an example of the authentication service providing unit 1205 for a login using the acquired organization ID, the acquired user ID, and the acquired password. The login requested by the OpenAM 1205*a* or 1205*b* is distributed to the OpenAM 1205*a* or 1205*b* by the ADC 1210. Hereinafter, the explanation is given on the premise that the login is distributed to the OpenAM 1205*a*.

In step S46, the ADC 1210 distributes the requested login to the OpenAM 1205*a*. The OpenAM creates the authentication ticket of the OpenAM 1205*a* when the authentication is successful, and returns the authentication ticket to the ADC 1210 as a response to the request for the login.

In step S47, the ADC 1210 creates an identifier of the OpenAM 1205*a* which creates the authentication ticket. In step S48, the ADC 1210 returns the authentication ticket of the OpenAM 1205 and the identifier of the OpenAM 1205 to the multivendor determination unit 1201.

In step S49, the multivendor determination unit 1201 requests the ADC 1210 to perform the SAML collaboration (the SAML request) using the authentication ticket of the OpenAM 1205*a* and the identifier of the OpenAM 1205. In step S50, the ADC 1210 sends the SAML request to the OpenAM 1205*a* based on the identifier of the OpenAM 1205*a* included in the SAML request.

When the authentication ticket is successfully authenticated, the OpenAM 1205*a* creates Javascript including the SAML response and returns the created Javascript from the ADC 1210 to the multivendor determination unit 1201. The multivendor determination unit 1201 returns the Javascript including the SAML response from the ticket administration unit 1129 to the browser.

Thereafter, the browser performs POST for the SAML response of the service providing system 1020 to ACS of the external service 1031 so as to substantialize the SAML collaboration with the external service 1031.

In the sequence chart of FIG. 12, if the SAML request including the authentication ticket issued by the OpenAM 1205*a* is sent to the OpenAM 1205*b*, an authentication error occurs. Therefore, the identifier of the OpenAM 1205*a* is created and used for the distribution by the ADC 1210. In the sequence chart of FIG. 12, the OpenAM can be operated in an active-active structure.

[General Overview]

In the service providing system 1020 of the embodiment, in a state where the SAML collaboration is substantialized by the OpenAM, the authentication ticket of the service providing system 1020 is separated from the OpenAM and administered. Therefore, the influence of the OpenAM can be reduced. For example, the OpenAM continuously performs a release or a maintenance such as an application of a patch, which requires a restart.

In the service providing system 1020 of the embodiment, even if the authentication ticket of the OpenAM is reset by the restart of the OpenAM, the authentication ticket of the service providing system 1020 is not reset. Therefore, in the service providing system 1020 of the embodiment, it is possible to substantialize a release or a maintenance of another authentication platform such as the OpenAM substantializing the authentication collaboration function without stopping a service of the service providing system 1020. Further, in the service providing system 1020 of the embodiment, by using the OpenAM in the active-active structure, the load distribution of the OpenAM can be performed.

The authentication platform of the service providing system 1020 is an example of a second authentication function (unit). The OpenAM is an example of a first authentication function. The ticket administration unit 1129 is an example of an administration unit. The multivendor determination unit 1201 is an example of an authentication function using unit. The authentication agent 1114 is an example of a proxy unit. The application delivery controller (ADC) 1210 is an example of a distribution unit.

The authentication ticket of the service providing system 1020 is an example of second authentication information. The authentication ticket of the OpenAM is an example of first authentication information. The SAML request and the SAML response are examples of a collaboration authentication request and a collaboration authentication response, respectively. The application 1101 is an example of an internal service. The external service 1031 is an example of an external service.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although an information processing system has been described in detail, it should be understood that various changes, substitutions, and alterations could be made thereto without departing from the spirit and scope of the invention.

This application is based upon and claims the benefit of priority of the prior Japanese Patent Application No. 2014-004888, filed on Jan. 15, 2014, the entire contents of which are incorporated herein by reference.

What is claimed is:

1. An information processing system including at least one information processing apparatus, the information processing system comprising:
    a first authentication function unit that issues first authentication information which is necessary to perform an authentication collaboration function between the information processing system and an external service provided outside the information processing system and indicates that an authentication is completed by a first authentication function;
    an administration unit that issues second authentication information which is necessary to use an internal service provided inside the information processing system and indicates that the authentication is completed by a second authentication function and performs, when a collaboration authentication request using the second authentication information is received from an external apparatus and when the received second authentication information is authorized, the collaboration authentication request for the first authentication function and sends the collaboration authentication response from the first authentication function to the external apparatus;
    an authentication function using unit that acquires the first authentication information by performing the authentication using the first authentication function based on the collaboration authentication request for first authentication function requested from the administration unit and sends the collaboration authentication response received from the first authentication function by requesting the collaboration authentication request to the first authentication function unit using the first authentication information; and
    a proxy unit that receives a request from the external apparatus to the internal service using the second authentication information before the internal service receive the request and controls the external apparatus so that the external apparatus displays a screen for performing the authentication using the second authentication function when the second authentication information is not authorized.

2. The information processing system according to claim 1, wherein the authentication function using unit acquires the first authentication information by performing the authentication using the first authentication function, which is one first authentication function selected from a plurality of first authentication functions, based on the collaboration authentication request for the first authentication function,
    performs the collaboration authentication request to the selected one first authentication function using the first authentication information, and
    sends the collaboration authentication response received from the first authentication function to the administration unit.

3. The information processing system according to claim 1, wherein the authentication function using unit deletes the first authentication information after performing the collaboration authentication request to the first authentication function unit using the first authentication information and receiving the collaboration authentication response from the first authentication function.

4. The information processing system according to claim 1, wherein the administration unit stores information related to the second authentication information in a memory unit when the second authentication function issues the second authentication information and determines whether the second authentication information is authorized using the information related to the second authentication information stored in the memory unit.

5. The information processing system according to claim 4, wherein the information related to the second authentication information used to determine whether the second authentication information is at least one of an issue data or an upper limit value.

6. The information processing system according to claim 1, wherein the administration unit causes the external apparatus to display a screen for performing the authentication using the second authentication function when the authorized second authentication information is not included in the collaboration authentication request received from the external apparatus.

7. The information processing system according to claim 1, the information processing system further comprising:
a distribution unit that distributes the collaboration authentication request from the authentication function using unit to the redundant first authentication function using the first authentication information.

8. The information processing system according to claim 7, wherein the distribution unit sends the first authentication function acquired by performing the authentication and identification information uniquely identifying the first authentication function from the first authentication information and the redundant first authentication function to the authentication function using unit and distributes the collaboration authentication request received from the authentication function using unit using the first authentication information based on identification information identifying the first authentication function.

9. An authentication method performed by an information processing system including at least one information processing apparatus, the information processing system uses first authentication information which is necessary to perform an authentication collaboration function between the information processing system and an external service provided outside the information processing system and indicates that an authentication is completed by a first authentication function, and second authentication information which is necessary to use an internal service provided inside the information processing system and indicates that the authentication is completed by a second authentication function, the authentication method comprising:
issuing the second authentication information;
performing, by a processor, when a collaboration authentication request using the second authentication information is received from an external apparatus and if the received second authentication information is authorized, the collaboration authentication request for the first authentication function and sends a collaboration authentication response from the first authentication function to the external apparatus;
acquiring the first authentication information by performing the authentication using the first authentication function based on the collaboration authentication request for the first authentication function and requesting the collaboration authentication request to the first authentication function unit using the first authentication information;
sending the collaboration authentication response received from the first authentication function the external apparatus; and
receiving, by a proxy unit, a request from the external apparatus to the internal service using the second authentication information before the internal service receive the request and controlling the external apparatus so that the external apparatus displays a screen for performing the authentication using the second authentication function when the second authentication information is not authorized.

* * * * *